United States Patent

Matzner et al.

[11] Patent Number: 5,483,564
[45] Date of Patent: Jan. 9, 1996

[54] LOWER TIE PLATE STRAINERS INCLUDING DOUBLE CORRUGATED STRAINERS FOR BOILING WATER REACTORS

[75] Inventors: Bruce Matzner, San Jose, Calif.; Eric B. Johansson, Wrightsville Beach, N.C.; Richard A. Wolters, Jr., San Jose, Calif.; Thomas G. Dunlap, San Jose, Calif.; Robert B. Elkins, San Jose, Calif.; Harold B. King, Wrightsville Beach, N.C.; Paul W. Sick, Wilmington, N.C.; Kevin L. Ledford, Wilmington, N.C.

[73] Assignee: General Electric Company, Schenectady, N.Y.

[21] Appl. No.: 196,738
[22] Filed: Feb. 15, 1994

Related U.S. Application Data

[63] Continuation-in-part of Ser. No. 44,687, Apr. 12, 1993, Pat. No. 5,384,814.
[51] Int. Cl.[6] ........................................................ G21C 1/04
[52] U.S. Cl. ............................ 376/352; 376/310; 376/313
[58] Field of Search ................................. 376/313, 310, 376/352; 976/DIG. 264, DIG. 268

[56] References Cited

U.S. PATENT DOCUMENTS

| | | | |
|---|---|---|---|
| 1,240,081 | 9/1917 | Moss | 210/521 |
| 1,504,233 | 8/1924 | Graham | 210/446 |

(List continued on next page.)

FOREIGN PATENT DOCUMENTS

| | | |
|---|---|---|
| 90104066.5 | 7/1990 | China . |
| 0196611 | 10/1986 | European Pat. Off. . |
| 0289829 | 11/1988 | European Pat. Off. . |
| 0311037 | 4/1989 | European Pat. Off. . |
| 0435744A1 | 7/1991 | European Pat. Off. . |
| 0432739A1 | 10/1991 | European Pat. Off. . |
| 0455011A1 | 11/1991 | European Pat. Off. . |
| 0432738A1 | 12/1991 | European Pat. Off. . |
| 0466553A1 | 11/1992 | European Pat. Off. . |
| 4006264A1 | 8/1991 | Germany . |
| 54-19080 | 4/1979 | Japan . |
| 54-141989 | 5/1979 | Japan . |
| 54-102493 | 8/1979 | Japan . |
| 57-102215 | 6/1982 | Japan . |
| 60-162985 | 8/1985 | Japan . |
| 62-96891 | 5/1987 | Japan . |
| 63-61183 | 3/1988 | Japan . |
| 63-157093 | 6/1988 | Japan . |
| 64-39593 | 2/1989 | Japan . |
| 64-83189 | 3/1989 | Japan . |
| 3-111795 | 5/1991 | Japan . |
| 3-274491 | 12/1991 | Japan . |
| 1214998 | 12/1970 | United Kingdom . |

*Primary Examiner*—Donald P. Walsh
*Assistant Examiner*—Meena Chelliah
*Attorney, Agent, or Firm*—Nixon & Vanderhye

[57] ABSTRACT

In a boiling water reactor fuel bundle, a three dimensional debris catching grid construction is placed within the flow volume defined by the lower tie plate assembly between the inlet nozzle and upper fuel rod supporting grid. A perforated plate is utilized having round holes as small consistent with the prevention of inadvertent closure due crudding and a hole pitch consistent with mechanical integrity requirements. The perforated plate is placed in a three dimensional construction such as a dome, cylinder, pyramid, inverted pyramid or corrugated construction spanning the flow volume of the lower tie plate assembly. As a consequence of this three dimensional grid construction, the total flow through area of the perforations in the metal plate does not introduce appreciable pressure drop in the lower tie plate assembly between the inlet nozzle and the rod supporting grid. Fluid movement at the debris restraining holes of the grid construction has a low flow velocity and a change in flow direction before passing through the holes to discourage debris from finding its way through the grid holes. Finally, it is possible to incorporate debris traps within the flow volume of the lower tie plate assembly that can cause trapping and subsequent removal of trapped debris upon fuel bundle replacement. A double corrugated plate having large holes in the lower plate and smaller holes in the upper plate is utilized to trap debris.

4 Claims, 12 Drawing Sheets

U.S. PATENT DOCUMENTS

| | | | |
|---|---|---|---|
| 1,992,472 | 2/1935 | Craig | 210/165 |
| 3,414,474 | 12/1968 | Swanson | 376/425 |
| 3,528,885 | 9/1970 | Kumpf | 376/440 |
| 3,725,199 | 4/1973 | Notari et al. | 376/352 |
| 3,801,453 | 4/1974 | Jones | 376/440 |
| 3,840,051 | 10/1974 | Akashi et al. | 138/37 |
| 3,878,870 | 4/1975 | Atherton et al. | 138/42 |
| 3,879,259 | 4/1975 | Persson et al. | 376/224 |
| 3,945,883 | 3/1976 | Hind et al. | 376/280 |
| 3,971,698 | 7/1976 | Wolff et al. | 376/352 |
| 4,032,398 | 6/1977 | Cross et al. | 376/443 |
| 4,036,690 | 7/1977 | Betts et al. | 376/175 |
| 4,053,358 | 10/1977 | Pennell | 376/280 |
| 4,053,359 | 10/1977 | Pennell et al. | 376/365 |
| 4,076,586 | 2/1978 | Bideau et al. | 376/364 |
| 4,096,032 | 6/1978 | Mayers et al. | 376/313 |
| 4,116,764 | 9/1978 | Jones | 376/280 |
| 4,198,272 | 4/1980 | Salmon | 376/175 |
| 4,376,091 | 3/1983 | Netkowicz et al. | 376/283 |
| 4,412,969 | 11/1983 | Tilbrook et al. | 376/280 |
| 4,420,457 | 12/1983 | Le Pargneux | 376/446 |
| 4,427,624 | 1/1984 | Marlatt et al. | 376/352 |
| 4,446,099 | 5/1984 | Schwind et al. | 376/277 |
| 4,505,877 | 3/1985 | Rion | 376/352 |
| 4,610,838 | 9/1986 | Gasparro et al. | 376/248 |
| 4,614,636 | 9/1986 | Walters | 376/451 |
| 4,615,862 | 10/1986 | Huckstein | 376/352 |
| 4,634,525 | 1/1987 | Yant | 210/171 |
| 4,652,425 | 3/1987 | Ferrari et al. | 376/352 |
| 4,655,995 | 4/1987 | Freeman et al. | 376/267 |
| 4,664,880 | 5/1987 | Bryan | 376/352 |
| 4,678,627 | 7/1987 | Rylatt | 376/313 |
| 4,684,495 | 8/1987 | Wilson et al. | 376/352 |
| 4,684,496 | 8/1987 | Wilson et al. | 376/352 |
| 4,716,012 | 12/1987 | Gasparro et al. | 376/352 |
| 4,772,447 | 9/1988 | Manson et al. | 376/441 |
| 4,781,884 | 11/1988 | Anthony | 376/352 |
| 4,826,653 | 5/1989 | Nylund et al. | 376/444 |
| 4,828,791 | 5/1989 | DeMario | 376/352 |
| 4,832,905 | 5/1989 | Bryan et al. | 376/352 |
| 4,849,161 | 7/1989 | Brown et al. | 376/439 |
| 4,900,507 | 2/1990 | Shallenberger et al. | 376/352 |
| 4,919,883 | 4/1990 | Bryan et al. | 376/352 |
| 4,980,121 | 12/1990 | Roberts et al. | 376/440 |
| 5,009,839 | 4/1991 | King | 376/352 |
| 5,024,806 | 6/1991 | Cioffi et al. | 376/352 |
| 5,024,807 | 6/1991 | Hatfield et al. | 376/352 |
| 5,030,412 | 7/1991 | Yates et al. | 376/352 |
| 5,037,605 | 8/1991 | Riordan, III | 376/352 |
| 5,071,617 | 12/1991 | Bryan et al. | 376/352 |
| 5,094,802 | 3/1992 | Riordan, III | 376/352 |
| 5,100,611 | 3/1992 | Nylund | 376/352 |
| 5,106,575 | 4/1992 | Nakamura et al. | 376/439 |
| 5,128,096 | 7/1992 | Grattier | 376/313 |
| 5,135,710 | 8/1992 | Grattier et al. | 376/313 |
| 5,160,697 | 11/1992 | Verdier et al. | 376/352 |
| 5,180,545 | 1/1993 | Grattier | 376/352 |
| 5,219,517 | 6/1993 | Nylund | 376/352 |
| 5,230,861 | 7/1993 | Nylund | 376/439 |
| 5,282,231 | 1/1994 | Adams et al. | 376/352 |
| 5,345,483 | 9/1994 | Johansson et al. | 376/313 |

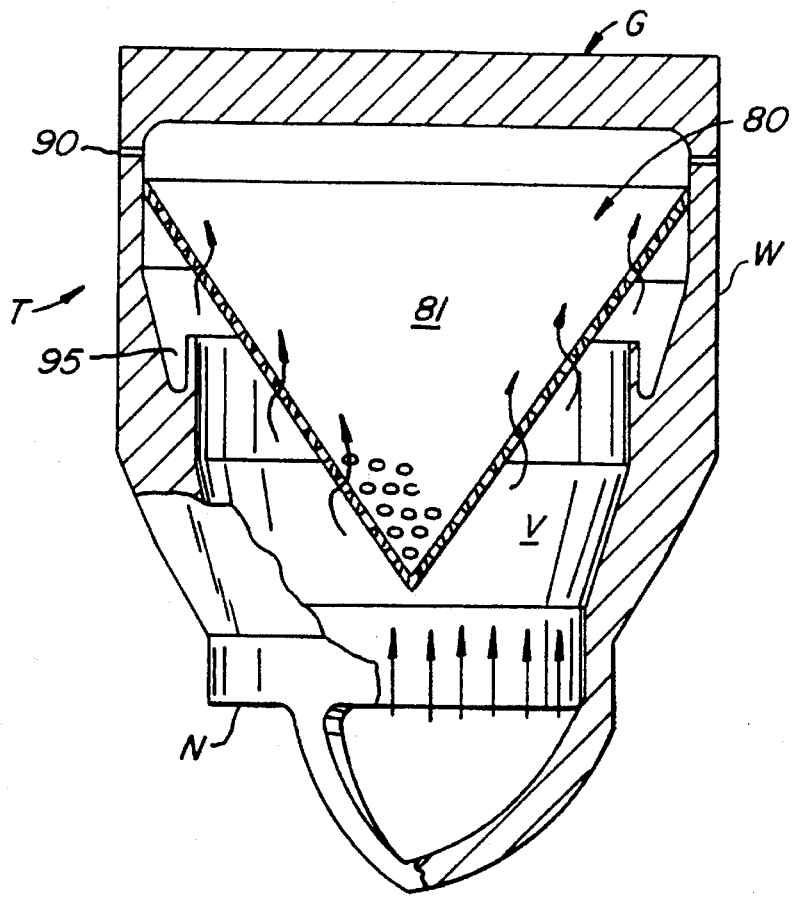
FIG. 5A.
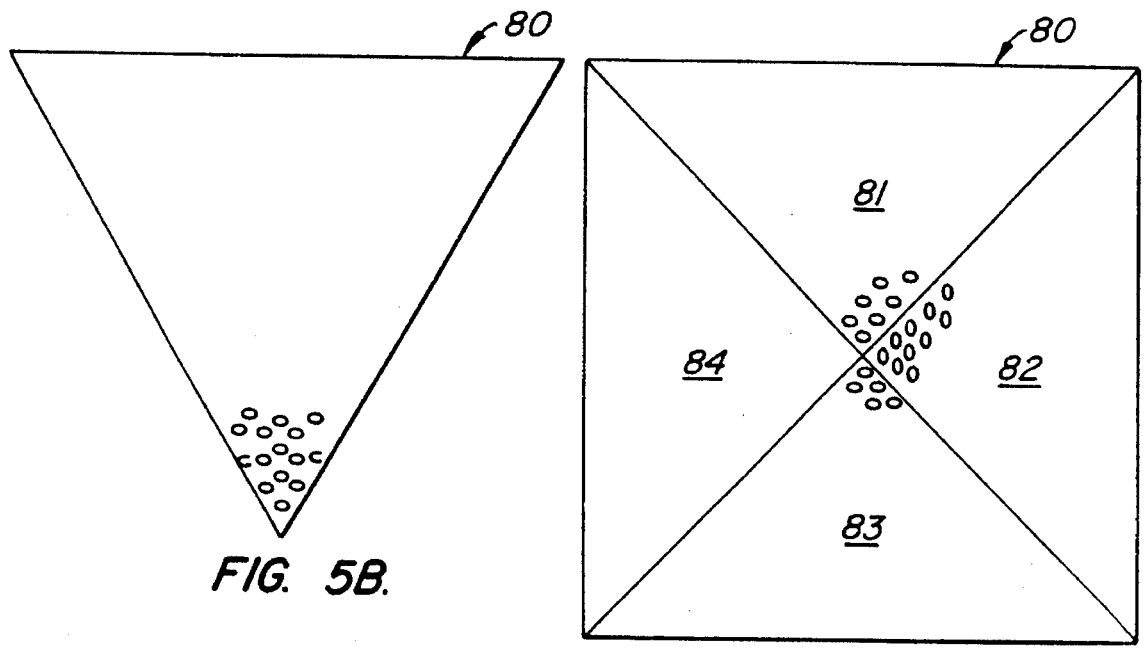
FIG. 5B.
FIG. 5C.

LOWER TIE PLATE STRAINERS INCLUDING DOUBLE CORRUGATED STRAINERS FOR BOILING WATER REACTORS

This application is a continuation-in-part of Ser. No. 08/044,687 filed Apr. 12, 1993, patented on Jan. 24, 1995 U.S. Pat. No. 5,384,814.

In a boiling water nuclear reactor fuel bundle, a debris catching arrangement is disclosed for incorporation within the flow volume between the inlet nozzle and the rod supporting grid of the lower tie plate assembly. The disclosed debris catching arrangements include provision for excluding flowing debris from entrainment into the fuel rod region of the fuel bundle. Provision is made in some cases to place traps for the debris within the lower tie plate, causing at least some of the debris to be removed when the fuel bundles are removed. This disclosure includes the addition of a double corrugated plate in the lower tie plate plenum for the capture of debris.

BACKGROUND OF THE INVENTION

Boiling water nuclear reactors operate for many years. Commencing with their initial construction and through their service lives, these reactors may accumulate debris in their closed circulation moderator systems. This debris can become an operating hazard if the debris is allowed to enter into the fuel bundle containing core region having the heat generating fuel rods. In order to understand this problem, a summary of reactor construction as it relates to the accumulation of debris in the core needs first to be given. Thereafter, fuel bundle construction will be set forth. Emphasis will be given to the need to preserve substantially unchanged the regions of pressure drop within the fuel bundles. Thereafter, the effects caused by debris entering into the fuel rod region of the fuel bundles will be summarized.

Boiling water nuclear reactor construction can be simply summarized for purposes of understanding the debris entrainment problem. Such nuclear reactors are provided with a large, central core. Liquid water coolant/moderator flow enters the core from the bottom and exits the core as a water steam mixture from the top.

The core includes many side-by-side fuel bundles. Water is introduced into each fuel bundle through a fuel bundle support casting from a high pressure plenum which is situated below the core. Water passes in a distributed flow through the individual fuel bundles, is heated to generate steam, and exits the upper portion of the core as a two phase water-steam mixture from which the steam is extracted for the generation of energy.

The core support castings and fuel bundles are a source of pressure loss in the circulation of water through the core. This pressure loss assures the substantially even distribution of flow across the individual fuel bundles of the reactor core. When it is remembered that there are as many as 750 individual fuel bundles in a reactor core, it can be appreciated that assurance of the uniformity of flow distribution is important. To interfere with the pressure drop within the fuel bundles could affect the overall distribution of coolant/moderator within the fuel bundles of the reactor core.

Having set forth the construction of the boiling water nuclear reactor insofar as is appropriate, attention can now be directed to the construction of the fuel bundles themselves.

The fuel bundles for a boiling water nuclear reactor include a fuel rod supporting lower tie plate assembly, which lower tie plate assembly is a cast structure. The lower tie plate assembly includes at its lowest point a downward protruding bail covering an inlet nozzle. This inlet nozzle includes entry to an enlarged flow volume within the lower tie plate. At the upper end of the flow volume, there is located a rod supporting grid. Between the supporting grid and the nozzle there is defined a flow volume.

The rod supporting grid has two purposes. First, the rod supporting grid provides the mechanical support connection for the weight of the individual fuel rods to be transmitted through the entire lower tie plate to the fuel support casting. Secondly, the rod supporting grid provides a flow path for liquid water moderator into the fuel bundle for passage between the side-by-side supported fuel rods.

Above the lower tie plate, each fuel bundle includes a matrix of upstanding fuel rods—sealed tubes each containing fissionable material which when undergoing nuclear reaction produce the power generating steam. The matrix of upstanding fuel rods includes at the upper end a so-called upper tie plate. This upper tie plate holds at least some of the fuel rods in vertical side-by-side alignment. Some of the fuel rods are attached to both the upper and lower tie plates. Usually, there are included between the upper and lower tie plates water rods for improvement of the water moderator to fuel ratio, particularly in the upper, highest void fraction region of the fuel bundle.

Fuel bundles also include about seven fuel rod spacers at varying elevations along the length of the fuel bundle. These spacers are required because the fuel rods are long (about 160 inches) and slender (about 0.4 to 0.5 inches in diameter), and would come into abrading contact under the dynamics of fluid flow and nuclear power generation within the fuel bundles. The spacers provide appropriate restraints for each fuel rod at their respective elevations and thus prevent abrading contact between the fuel rods and maintain the fuel rods at uniform spacing relative to one another along the length of the fuel bundle for optimum performance. As will hereafter be developed, these spacers are sites where debris can be trapped and damage the fuel rods.

Each fuel bundle is surrounded by a channel. This channel causes water flowing between the tie plates to be restricted to only one bundle in an isolated flow path between the tie plates. The channel also serves to separate the steam generating flow path through the fuel bundles from the surrounding core bypass region, this region being utilized for the penetration of the control rods. The water in the bypass region also provides neutron moderation.

In the operation of a boiling water nuclear reactor, it is important to understand that the maintenance of the originally designed flow distribution is important. Specifically, from the lower (high pressure) plenum inlet to the core to the outlet from the core of the steam and water mixture through the upper tie plates of the fuel bundles, about 20 pounds per square inch (psi) of pressure drop is encountered at typical 100%/100% flow operating conditions. About 7 to 8 psi of this pressure drop occurs through the fuel support casting. This pressure drop is mainly to assure the uniform distribution of coolant/moderator flow through the many fuel bundles making up the core of the reactor and is related to the prevention of operating instabilities within the reactor at certain power rates of the reactor. At the lower tie plate of each fuel bundle, from the inlet nozzle into the flow volume and through the fuel rod supporting grid, about 1 to 1½ psi pressure drop occurs which contributes to establishing flow distribution between the individual fuel rods of each fuel bundle. Finally, through the fuel bundle itself—from the lower supporting grid to the exit at the upper tie plate—about 11 psi of pressure drop usually occurs.

When new fuel bundles are introduced into a reactor core, these pressure drops must be preserved. Otherwise, the coolant/moderator flow distribution could be compromised.

Having summarized the construction and operation of a boiling water nuclear reactor, the problem of debris resident within the closed circulation moderator system of the reactor can now be understood. Typically debris within boiling water nuclear reactors can include extraneous materials left over from reactor construction. Further, corrosion during the reactor lifetime also liberates debris. Finally, and during the numerous outages and repairs, further debris accumulates. It will therefore be understood that nuclear reactors constitute closed circulation systems that essentially accumulate debris with increasing age.

It has been discovered that a particularly vexing and usual place for the accumulation of debris is in the fuel bundles between the fuel rods particularly in the vicinity of the fuel rod spacers. It will be remembered that each fuel rod is surrounded by the spacer at the particular elevation of the spacer. Debris particles tend to lodge between the spacer structure and the fuel rods and often dynamically vibrate with the coolant/moderator flow in abrading contact to the sealed cladding of the fuel rods. Such flow induced vibration within the reactor, can and has both damaged—as by fretting—as well as ruptured the cladding of the fuel rods. If a sufficient number of cladding ruptures occurs, plant shutdown could be necessary.

SUMMARY OF THE PRIOR ART

Prior art attempts at the placement of devices for preventing debris from entering into the regions of the fuel rods have included alteration of the grid support structure of the lower tie plate assembly. In Nylund U.S. Pat. No. 5,100,611 issued Mar. 31, 1992, an alteration to the grid structure is disclosed. This alteration includes replacing the required through holes of the grid structure with flow channel parts that have center lines that are non-collinear. Because these flow channels are part of the fuel rod supporting grid, the size of the through holes is necessarily large to preserve the rod supporting grid strength and the area over which the holes are distributed is only co-extensive to the lower tie plate assembly at the supporting grid.

Attempts to screen debris have been made in pressurized water reactors. In Bryan U.S. Pat. No. 4,664,880 issued May 12, 1987 a wire mesh debris trap is utilized at the bottom of a pressurized water reactor fuel bundle. In Rylatt U.S. Pat. No. 4,678,627 issued July 7, 1987, this structure is modified to include a debris retaining trap. These pressurized water reactor fuel bundles constitute open structures and lack the channel confined flow path between the upper and lower tie plates common to boiling water nuclear reactors. The channel structure, required in boiling water nuclear reactor construction, is wholly absent in pressurized water reactor construction. Since flow can occur between adjacent fuel bundles in a pressurized water reactor along the entire length of the fuel bundles, the placement of the disclosed screens and traps does not occur within a confined flow path. Further, such fuel bundles lack the disclosed lower tie plate assembly utilized with boiling water reactors including the inlet nozzle, and the defined flow volume to rod supporting grid at the bottom of the fuel bundles.

In one prior art debris catching device, the lower tie plate is modified with serpentine path—almost in the form of a chevron. Overlying this construction there are placed rod supporting bars so that the weight of the rods does not crush the underlying serpentine path.

SUMMARY OF THE INVENTION

In a boiling water reactor fuel bundle, a three dimensional debris catching grid construction is placed within the flow volume defined by the lower tie plate assembly between the inlet nozzle and upper fuel rod supporting grid. A perforated plate is utilized having round holes as small as 0.050 of an inch diameter on a pitch sufficiently large to assure structural integrity throughout the life of the fuel bundle. Perforated plate material may be placed in a three dimensional construction such as a dome, cylinder, pyramid, inverted pyramid or corrugated plate construction spanning the flow volume of the lower tie plate assembly. As a consequence of this three dimensional grid construction, the total flow-through area of the perforations in the metal plate should be at least as great this flow area through the bundle without this debris catcher, and does not introduce significantly additional pressure drop in the lower tie plate assembly between the inlet nozzle and the rod supporting grid. Fluid movement at the debris stopping holes of the grid construction has a sufficiently slow flow velocity to discourage debris from finding its way through the grid holes. Many of the disclosed three dimensional grid constructions cause a flow direction change at the debris restricting holes requiring a momentum change to the liquid coolant/moderator and leaving the debris moving parallel to the grid surface. The debris, having a much greater density than the coolant, cannot make the abrupt change in direction and is carried parallel to the grid surface to regions beyond the perforated region. At the same time, the grid structure constitutes a mechanically sound construction that will not itself break apart and become the source of more debris. Alternately, the lower tie plate assembly can consist of a separate rod supporting grid bolted to an inlet nozzle assembly, the assembly bolting occurring either by separate bolts or extended threaded tie rod plugs. Further, the grid can be fabricated from the same stainless steel from which the lower tie plate assembly is cast, enabling a welded bonding to the casting of the lower tie plate assembly. Finally, it is possible to incorporate debris traps within the flow volume of the lower tie plate assembly that can cause trapping and subsequent removal of trapped debris upon fuel bundle replacement. A double corrugated plate having large holes in the lower plate and smaller holes in the upper plate is utilized to trap debris.

BRIEF DESCRIPTION OF THE DRAWINGS

FIGS. 5A, 5B and 5C are respective side elevations within the lower tie plate, a side elevation removed from the lower tie plate, and a plan view of a grid construction including an inverted pyramid fastened at its base to the flow volume of the lower tie plate adjacent the upper rod supporting grid, which grid is temporarily removed for the pyramid debris catcher construction insertion;

DESCRIPTION OF THE PREFERRED EMBODIMENT

Figure 1:
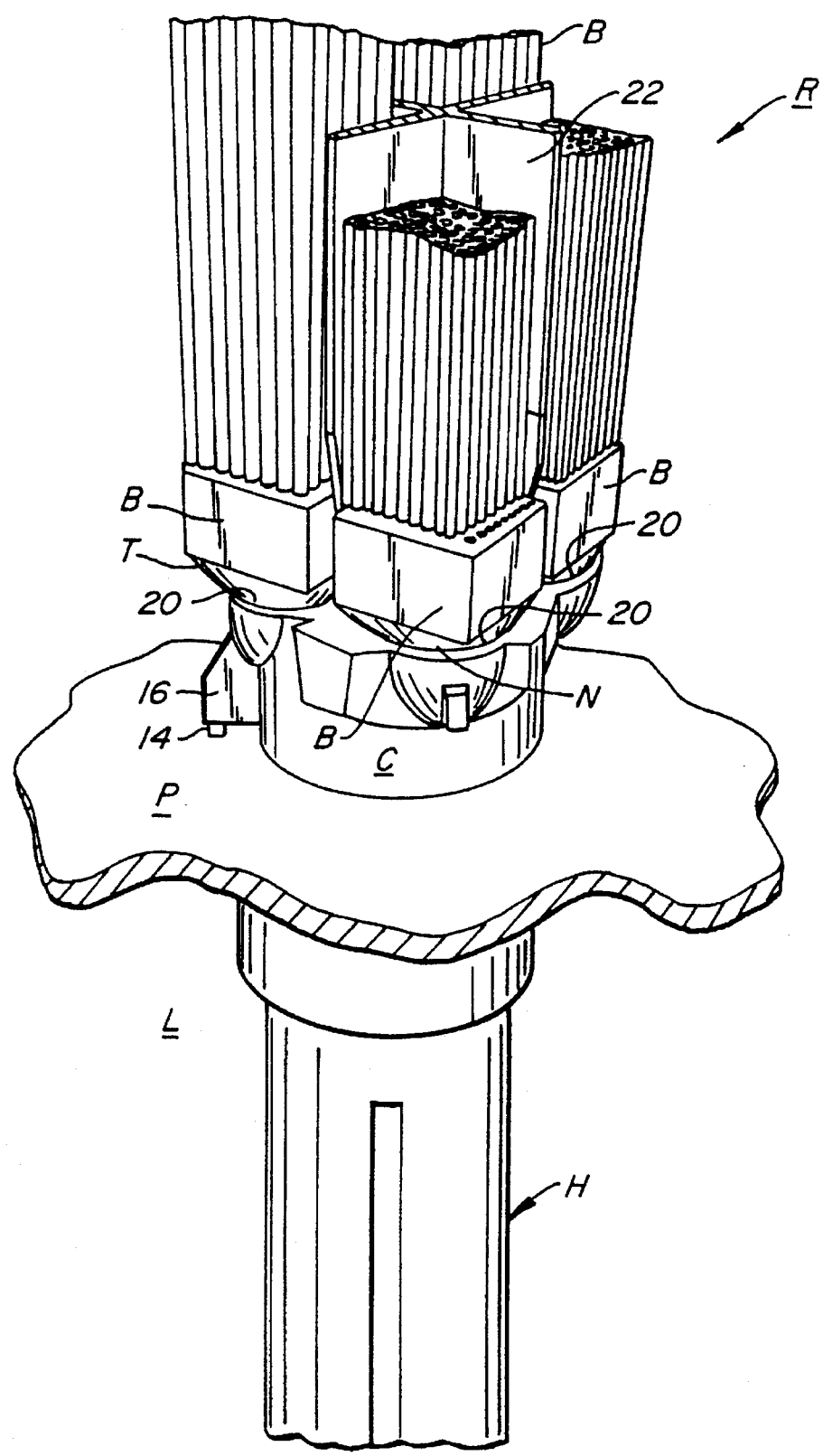
FIG. 1 is a schematic of a boiling water nuclear reactor core section illustrating the lower high pressure plenum, one fuel bundle support casting, a group of four fuel bundles support at their respective lower tie plate assemblies on the support casting.

Referring to FIG. 1, a pertinent detail of a portion of a reactor core is shown. Control rod drive housing H has fuel support casting C supported thereon. Fuel support casting C includes arm 16 which orients casting C with respect to pin 14 in core plate P.

Core plate P divides high pressure lower plenum L from core R, preserving the necessary pressure differential barrier to cause the controlled circulation within the many individual fuel bundles of the reactor.

Fuel support casting C includes four apertures 20 onto which four fuel bundles B at their respective lower tie plate assemblies T are placed. Each lower tie plate assembly T is disposed to cause its inlet nozzle N to communicate to one of the apertures 20 of the fuel support casting.

Fuel support casting C also includes apertures through which control rods 22 penetrate to the interstices of the four fuel bundles sitting on top of the fuel support casting C. Since the action of the control rods is not important with respect to this invention, further discussion of this aspect of the reactor will not be included.

Remembering that only four out of a possible 750 fuel bundles are illustrated, it will be understood that the pressure drop across core plate P is important. Accordingly, a review of the pressure drop within a boiling water nuclear reactor can be instructive.

First, and through an orifice (not shown) in the fuel support casting C, an approximate 7 to 8 psi pressure drop occurs at typical 100% power/100% flow operating conditions. This pressure drop is utilized to ensure uniform distribution of bundle coolant flow through the many (up to 750) fuel bundles within a boiling water nuclear reactor.

Secondly, at in the lower tie plate of the fuel bundles on each fuel support casting C, approximately 1½ psi of pressure drop occurs. This pressure drop is a result primarily of the change in flow velocity occurring through this complex geometry structure.

Finally, and as the coolant rises and generates steam within the fuel bundle, approximately 10 to 12 psi of pressure drop is incurred. This pressure drop is distributed throughout the length of the fuel bundle—and is important to the operating stability of both the individual fuel bundles and the collective fuel bundles constituting the core of the nuclear reactor.

The reader should understand that the summary of pressure drop given above is an over simplification. This is a very complex part of the design and operation of a nuclear reactor. Having said this much, one point must be stressed. Pressure drop within the individual fuel bundles of a boiling water must remain substantially unchanged. Accordingly, if apparatus for preventing debris entrainment into the fuel bundles is going to be utilized, appreciable change in overall fuel bundle pressure drop should be avoided.

Having carefully reviewed the requirements for the avoidance of increased pressure drop in debris restricting devices, several further comments can be made.

First, any debris catching arrangement should be sufficiently rigid so that the excluding apparatus does not under any circumstance break apart, fail to stop debris, and become the source of further debris itself. For this reason, wire screens are not used. Instead, perforated metal is in all cases utilized in the examples that follow.

Second, we have found that it is desirable to restrict pressure drop to a minimum. This can be done by making the velocity of flow through the apertures themselves as low as feasible. A second reason for this limitation is the entrainment of the debris in the flow. Assuming entrainment of debris in the flow, if any possible angle of attack can be realized that will enable debris to pass through an aperture, given sufficient time, passage through the aperture will eventually occur. By maintaining slow velocity at the respective apertures, entrainment of debris is less likely to occur. Further, it has been found that a reorientation of the flow at a rejecting hole to an angle where debris passage is less likely can be achieved. Consequently, flow velocity at restricting apertures is restricted to the minimum possible value.

Third, we find that modification of the rod supporting grid—a technique utilized in the prior art—is not satisfactory. Specifically, we prefer to use straining apertures that are as small as possible—down to a dimension of 0.050 of an inch diameter. Unfortunately, the rod supporting grid is a member that must have the required static and dynamic properties to support the fuel rods under all conceivable conditions. Utilizing a matrix of such holes in the rod supporting grid at the pitches required for low pressure drop in the lower tie plate is not practicable. First, since the small apertures would be confined to the plane of the rod supporting grid, a total reduction of flow area will be present that would lead both to unacceptable pressure drop as well as high flow velocities through the individual holes in rod supporting grid. Further, such a matrix of small apertures in the rod supporting grid would reduce the strength of the grid to a level below that required for support of the fuel rods.

We have identified the so-called flow volume of the lower tie plate assembly as a primary candidate for the location of debris rejection apparatus—preferably the perforated metal utilized with this construction. In boiling water nuclear reactor fuel bundles at the lower tie plate assembly, there is defined between the nozzle at the lower end and the fuel rod supporting grid at the upper end, a relatively large flow volume. This flow volume is sufficiently large to accommodate a three dimensional structure—with one side of the three dimension structure communicated to the nozzle inlet and the other side of the three dimensional structure communicated to the rod supporting grid. At the same time, periphery of the three dimensional supporting-structure can be attached to the sides of the lower tie plate assembly—so that all fluids passing through the flow volume of the lower tie plate simply must pass through the restricting apertures of the perforated plate. Only small modification to the lower tie plate assembly is required.

The flow volume in the lower tie plate assembly has an additional advantage. Specifically, and if the flow restricting grid has to be confined to a plane extending across the lower tie plate flow volume, the apertures in the plate would define a total flow area less than the plane in which the perforated plate was disposed. Where a perforated plate is utilized to manufacture a three dimensional structure, the area of the available apertures can increase beyond that total area possible when the perforated plate is confined to a flat plane. In fact, where sufficient structure is utilized, the total flow area available in the aggregated holes of the three dimensional structure can approach and even exceed the total cross sectional area across the flow volume of the lower tie plate assembly before the insertion of the debris restricting assembly. In addition a properly designed debris catcher assembly could improve the flow distribution at the inlet to the fuel bundle.

Having set forth these considerations, attention can be directed to the embodiments of the invention.

Figure 2:
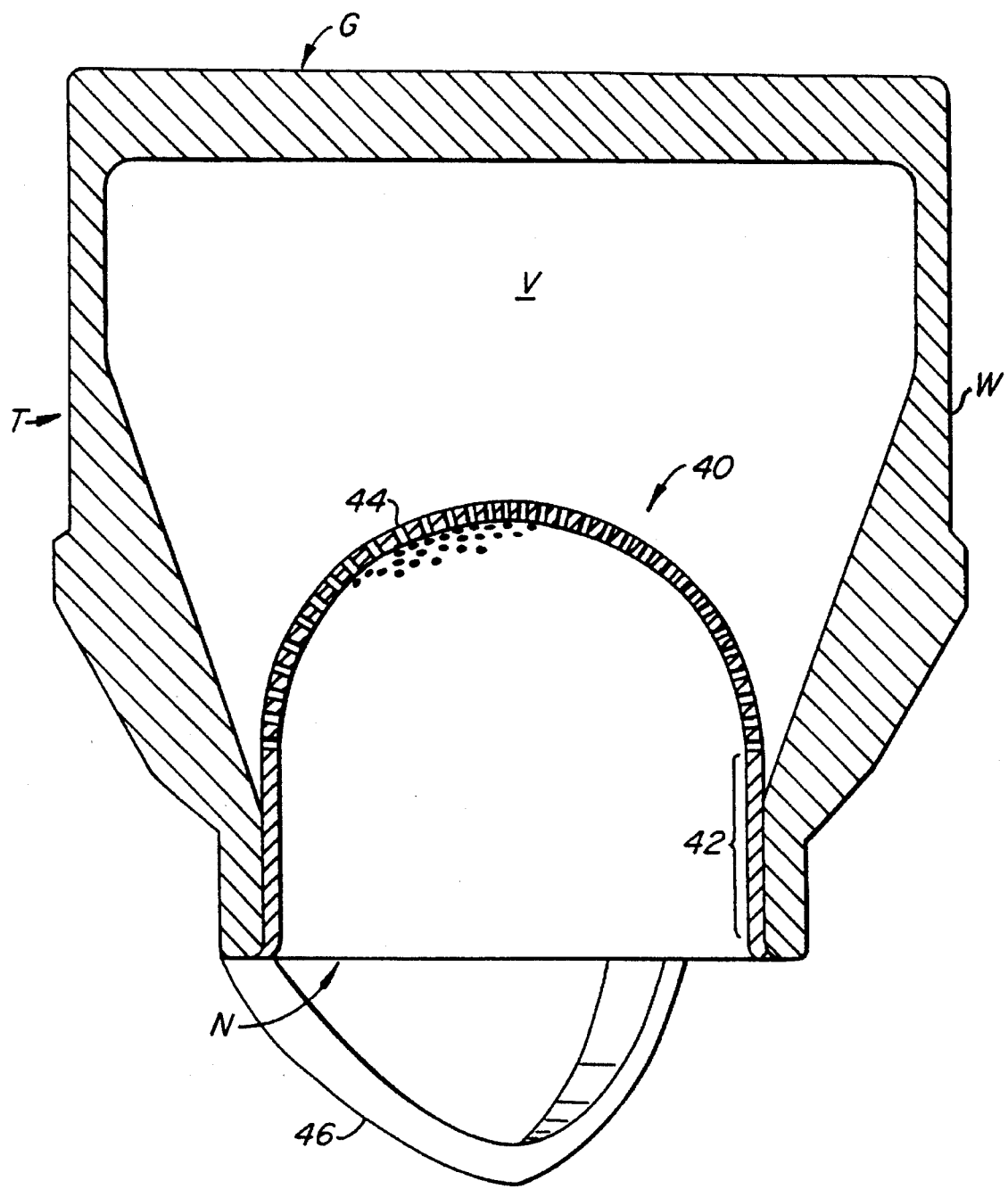
FIG. 2 is a side elevation section of a lower tie plate assembly illustrating a debris catcher construction having a combination dome shaped and cylindrical base fitted to the lower tie plate assembly by temporary removal of the bail and fitting of the debris catcher construction to the inlet nozzle.

Referring to FIG. 2, debris catcher 40 is a separate piece consisting of a short cylinder 42 integral with a hemispherical cap 44. The hemispherical cap has an area approximately twice the are of the lower tie plate assembly inlet throat. Therefore the total flow area through the holes in the cap can be greater than the throat area. By varying the height of the assembly, the flow area through the holes can be adjusted to give an optimum pressure drop through the lower tie plate.

The debris catcher of FIG. 2 has a favorable effect on the flow distribution in the flow volume of the lower tie plate assembly. The flow exiting from each hole has a direction normal to the hemispherical cap. The net effect of flow from all of the holes is to distribute the flow uniformly over the area of lower tie plate assembly at the horizontal plane near the rod supporting grid G. This uniform flow results in a uniform flow into the fuel bundle.

The debris catcher of this invention requires a modification of the lower tie plate assembly fabrication. Currently the entire assembly T, including the bars 46 of the lower bail, is a single casting. In order to insert the debris catcher, the bars 46 are omitted from the lower tie plate assembly casting, and are a separate casting. The debris catcher is inserted into the modified lower tie plate assembly casting and is welded in place, and then bars 46 are welded over the nozzle N.

Referring to hemispherical cap 44, one disadvantage is present. Specifically, and as to those apertures in the dome, debris entrained in the flow will essentially approach the individual holes of the hemispherical cap 44 directly—that is axially of the axis of each of the holes. This is not preferred. It is better if the overall flow requires a change in direction—in the order of up to 90°—so that the entrained debris and the fluid can have the added forces of momentum separation for separating the usually heavier debris from the less dense coolant/moderator flow. If the flow approaches the screening apertures and then turns in the order of 90°, the tendency will be for the debris to be left on the surface of the three dimensional grid construction. This being the case, attention can be devoted to at least some of the following designs.

Figure 3A:
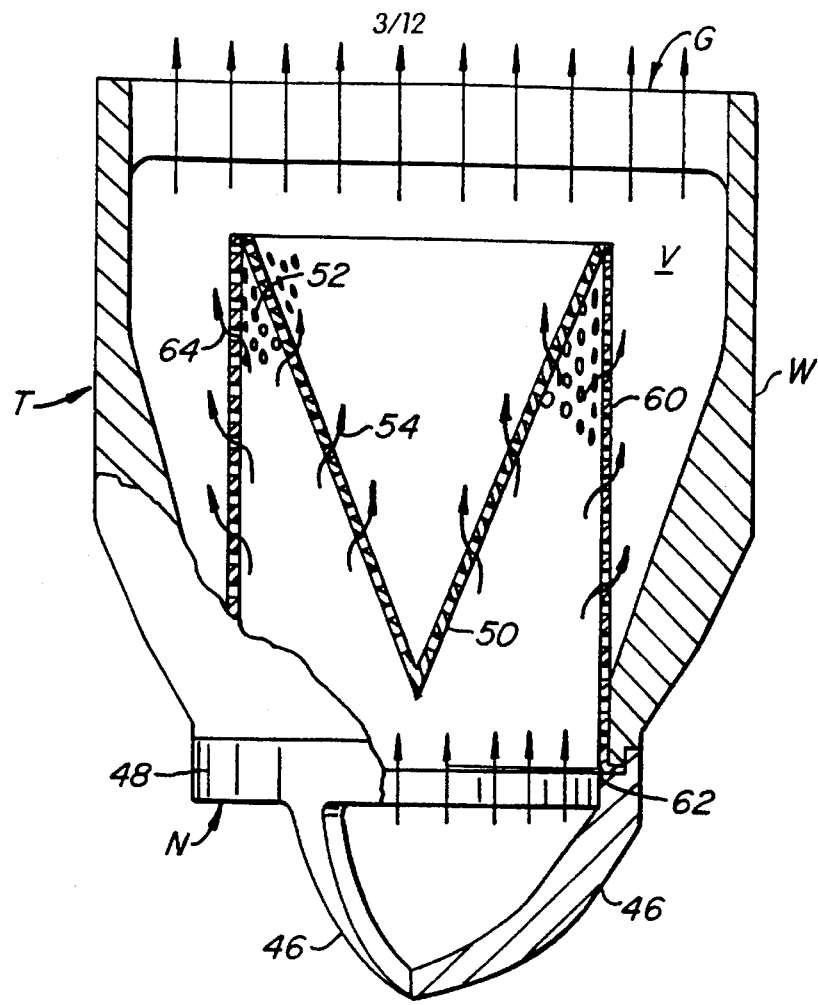
FIGS. 3A, 3B and 3C are respective side elevations within the lower tie plate, a side elevation removed from the lower tie plate, and a plan view of a debris catcher construction including an inverted cone construction mounted at the end of cylindrical basket with basket attachment occurring at the inlet nozzle of the lower tie plate assembly and requiring the mounting as in FIG. 2.
Figure 3B:
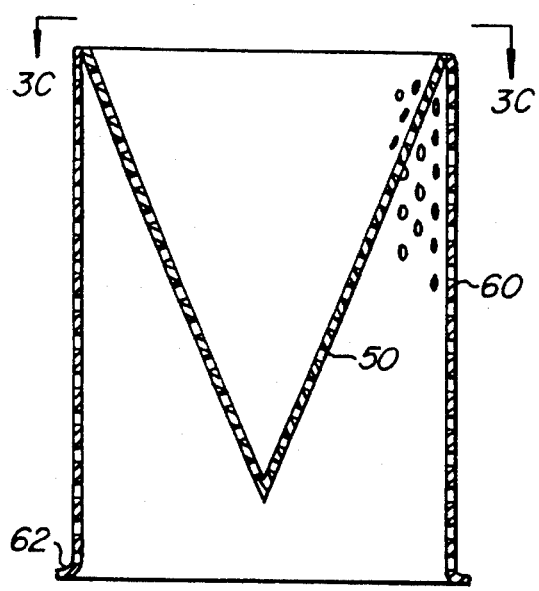
Figure 3C:
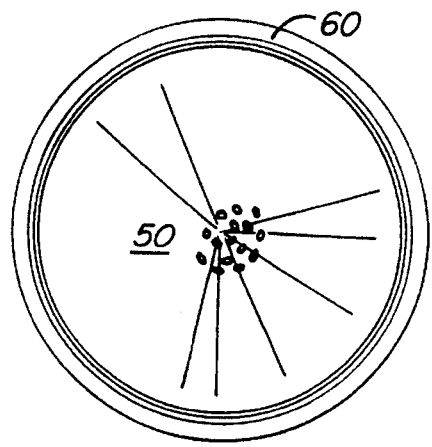

Referring to FIGS. 3A–3C, a three dimensional grid construction is shown having a central inverted cone 50 and a supporting cylinder 60. A separate casting N consists of the bars 46 and a circular ring 48. A lip 62 at the bottom of the cylinder 60 is captured when the casting N is attached to the main casting T.

Flow arrows 54, 64 demonstrate with respect to cone 50 and cylinder 60 the general change in direction required for coolant/moderator flow through the three dimensional grid construction disclosed. This has the tendency to cause debris to be deposited on the surface of the perforated plate construction and carried along the surface of the grids to the region 52 where the inverted cone 50 joins the cylinder 60.

Figure 4A:
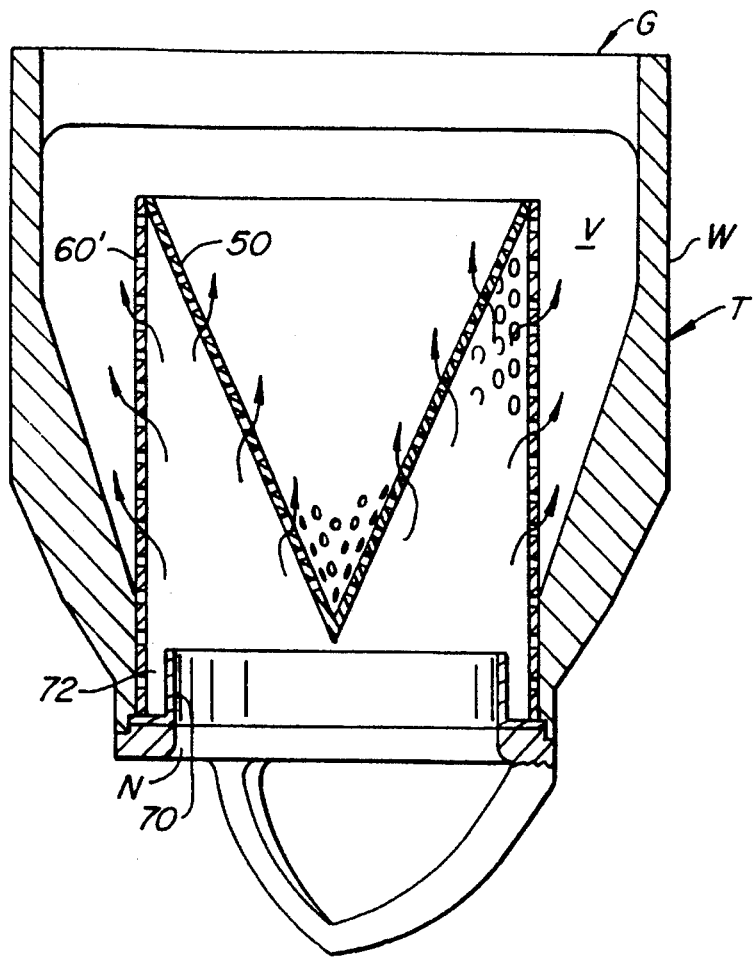
FIGS. 4A, 4B and 4C are respective side elevations within the lower tie plate, a side elevation removed from the lower tie plate, and a plan view of a grid construction including an inverted cone construction mounted at the end of cylindrical basket with basket attachment occurring at the modified inlet nozzle of the lower tie plate assembly for defining a debris trap annulus around the inlet nozzle.
Figure 4B:
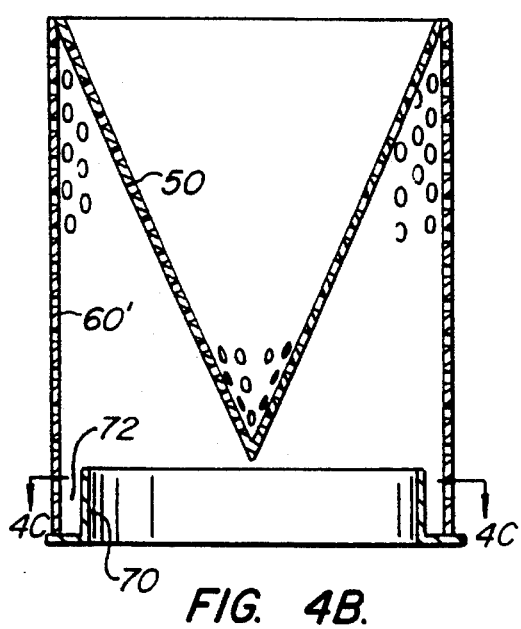
Figure 4C:
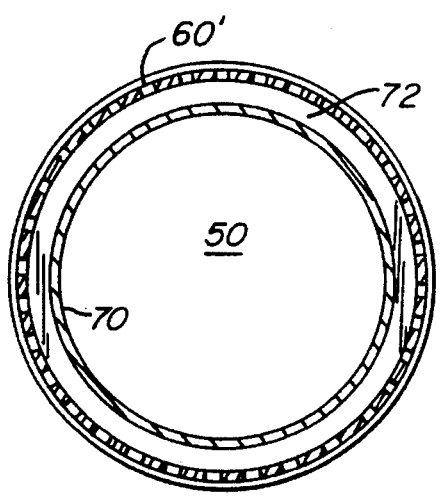

Referring to FIGS. 4A–4C, a modification of the concept of FIGS. 2 and 3A–3C is shown containing a debris trap. Specifically lower tie plate assembly T in the vicinity of nozzle N is enlarged and fitted with a slightly enlarged cylinder 60'. To the bottom of this is mounted an annulus assembly 70. Annulus assembly 70 gives substantially the same inlet nozzle N dimension as the prior art.

The annular volume 72 forms an occluded space which can be used as a debris trap. Specifically, and during prolonged flow an operation, it can be expected that debris will migrate along the surfaces of the three dimensional grid construction to the top of the cylinder 60' and the base of the inverted cone 50. When the flow is reduced or stopped, debris will fall. At least some debris will move into the occluded annular volume 72. Further, and once in annular volume 72, when flow recommences, complete re-entrainment of debris is unlikely. Consequently, once a fuel bundle is removed, to the extent that debris is trapped in annular volume 72, the debris likewise will be removed.

Referring to FIGS. 5A–5C, a three dimensional construction featuring an inverted pyramid 80 is utilized having pyramid faces 81–84 fastened to the inside of lower tie plate assembly T adjacent rod supporting grid G. Alteration of the fabrication of assembly T occurs by casting grid G as a separate assembly and joining grid G as by welding at 90.

As a possible additional feature, it can be further seen that an annulus 95 has been cast interiorly of flow volume V of lower tie plate assembly T, this annulus being immediately adjacent the base of the inverted pyramid 80. This has the advantage of allowing debris to fall a short distance to the formed debris trap within flow volume V without having the fall of the debris scatter the debris away from the underlying debris catching shadow formed by the annulus 95.

Figure 6A:
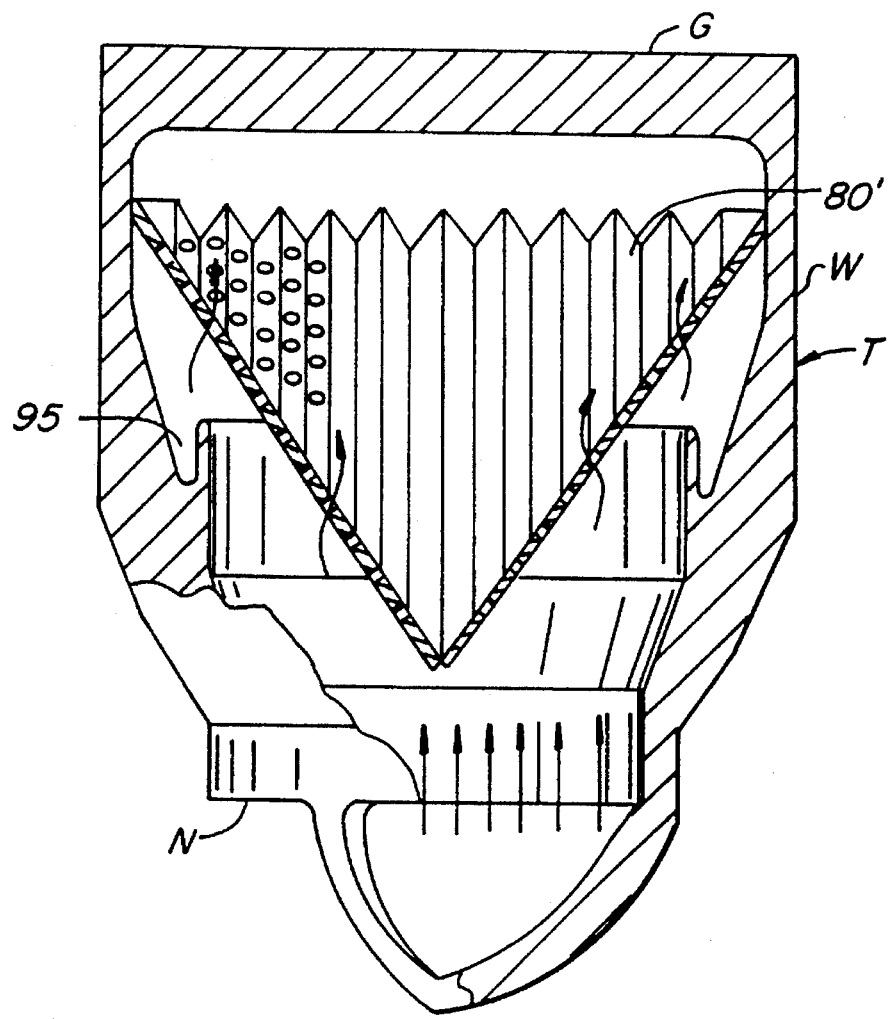
FIGS. 6A and 6B are respective side elevations within the lower tie plate and a side elevation removed from the lower tie plate of a pyramid similar to that show in FIGS. 5A, 5B and 5C, this pyramid having corrugated sides.
Figure 6B:
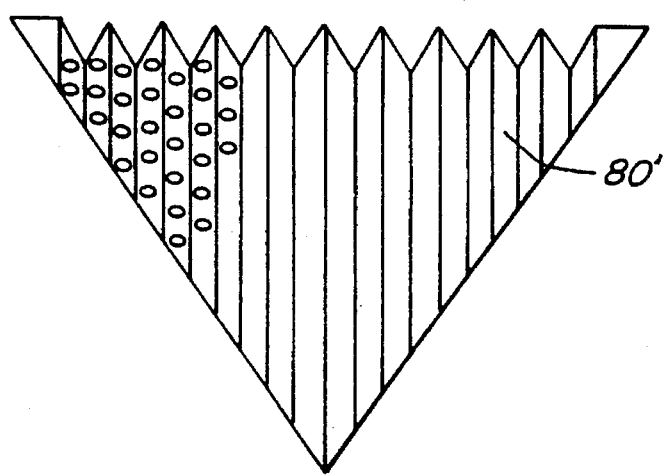

Referring to FIGS. 6A–6C, an inverted pyramid construction 80' is illustrated having the discrete sides fabricated from a corrugated construction. This has the advantage of expanding the total area of the grid construction while maintaining the three dimensional grid construction substantially unchanged.

Figure 7A:
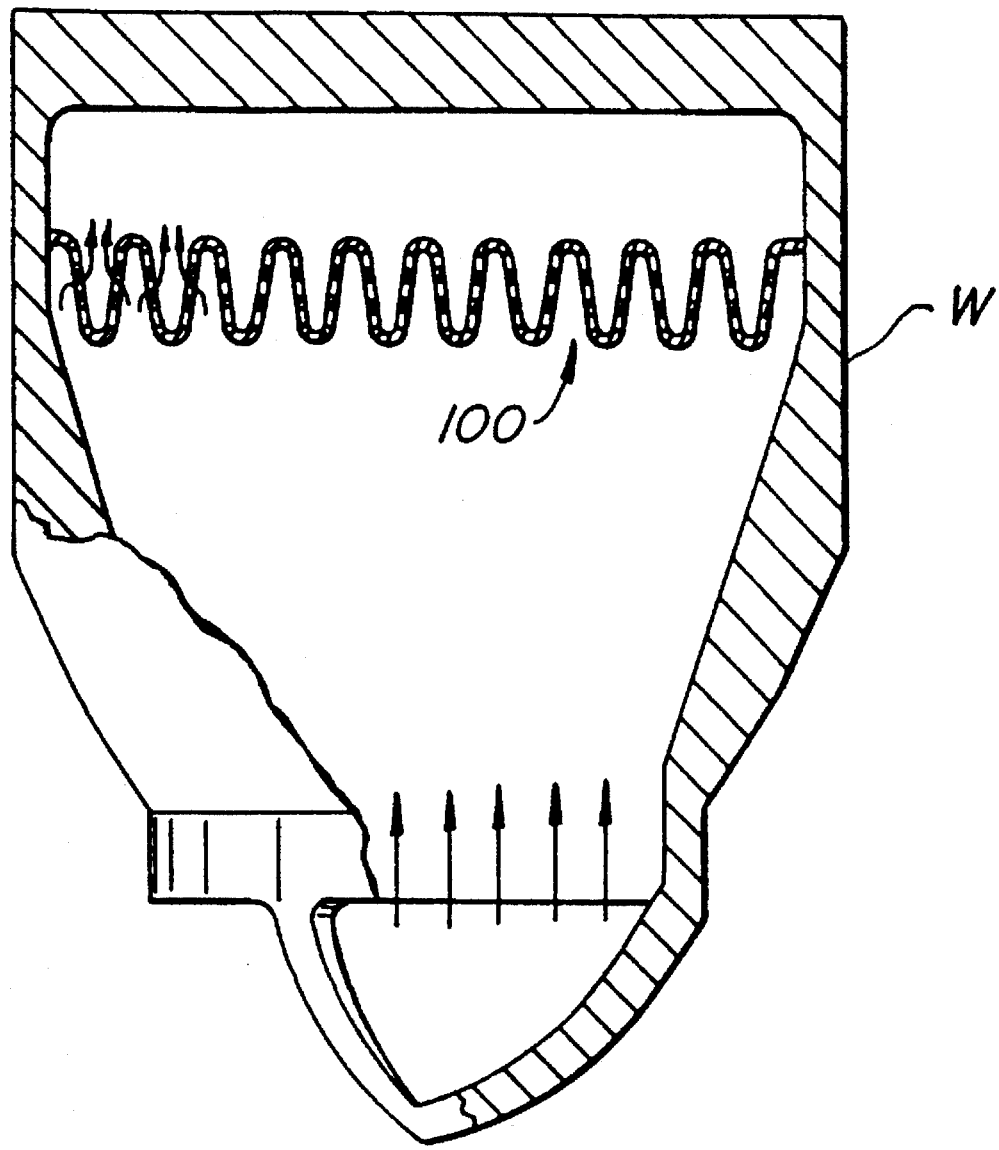
FIGS. 7A, 7B, and 7C are respective side elevations within the lower tie plate, a perspective view of a grid construction, and first and second sectional details of a corrugated debris catcher construction.
Figure 7B:
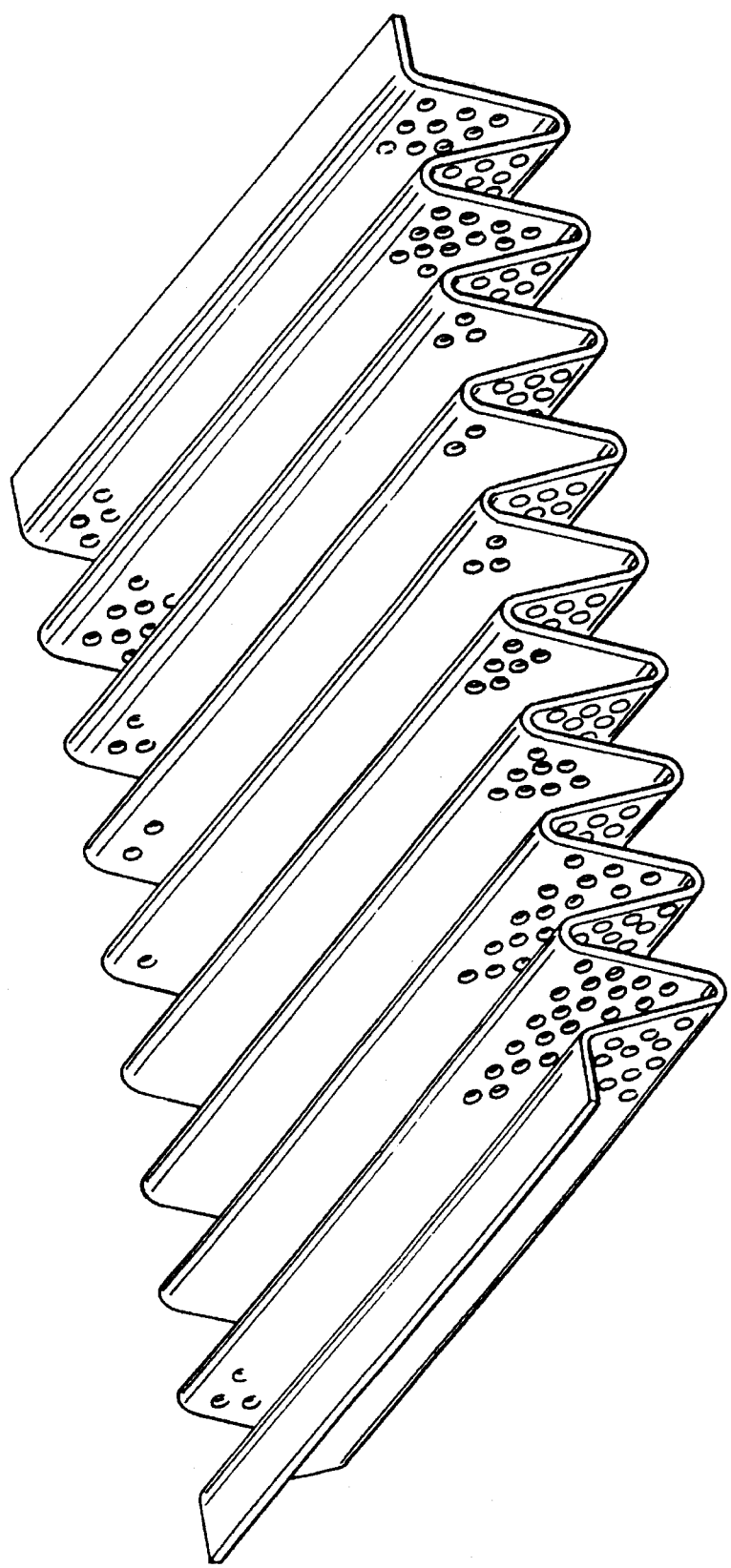

Referring to FIGS. 7A and 7B, a three dimensional grid construction is shown wherein a perforated plate 100 is provided with numerous corrugations. The corrugations—like the other three dimensional constructions—expand the effective area as it is disposed across flow volume V of lower tie plate assembly T.

Figure 7C:
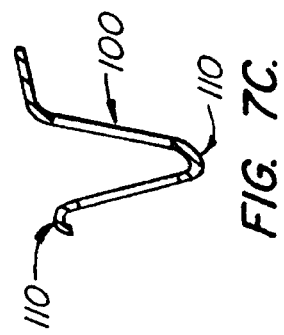

FIG. 7C is a detail of the construction. Holes can be placed over the entire surface of the plate, or they can be omitted in regions of sharp bending 110. Using holes over the entire surface provides more flow area and reduces pressure loss. However in regions 110 the general flow direction is the same as the axis of the holes, so some debris may pass through. When holes are omitted in regions 110, all the flow must make nearly 90° bends. Thus the construction with no holes in the regions of sharp bends is preferred, as shown in FIG. 7C.

Figure 8A:
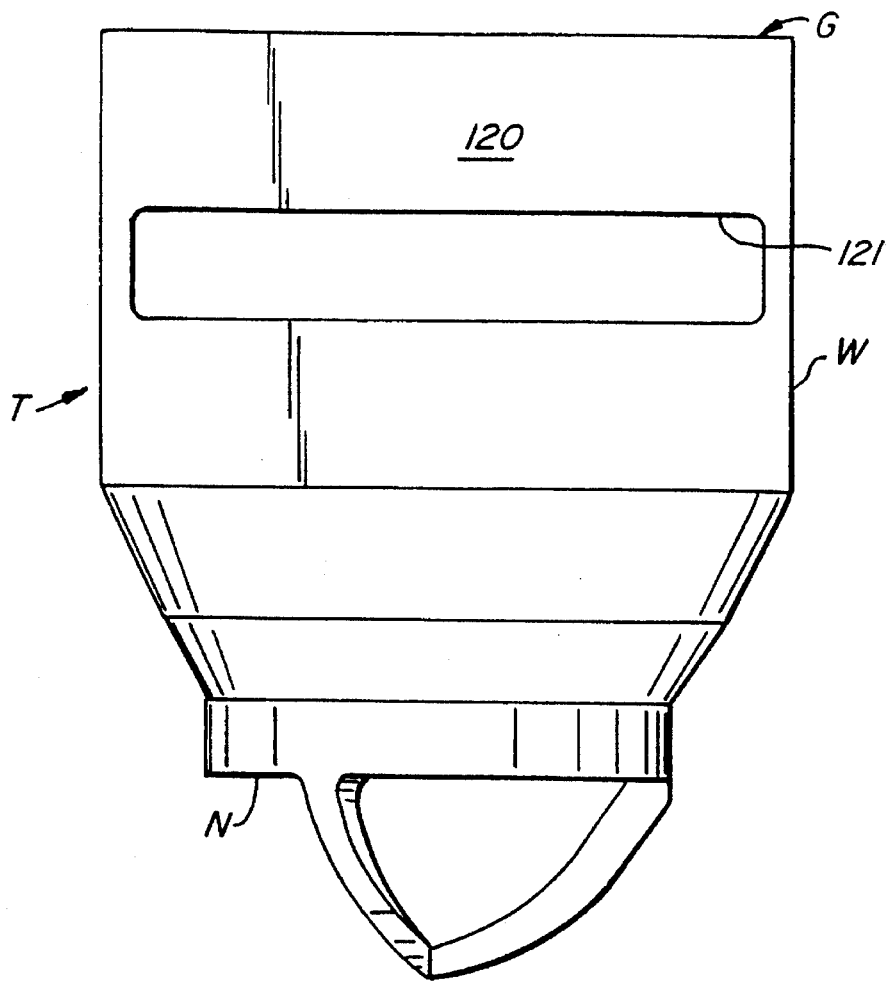
FIGS. 8A and 8B are respective side elevation and perspective view of a corrugated grid construction similar to the construction of FIGS. 7A, 7B and 7C with insertion here being illustrated through an aperture in the sidewalls of the lower tie plate assembly.
Figure 8B:
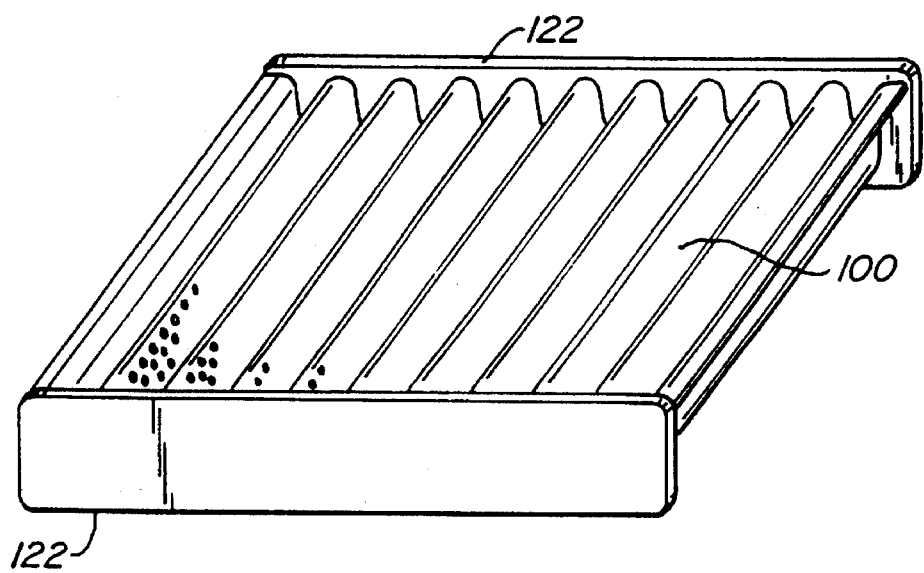

Thus far, all constructions have shown modification to the lower tie plate assembly T either by introducing the three dimensional grid structure at the nozzle N or under rod supporting grid G. As shown in FIG. 8, the three dimensional grid assembly can be introduced through the lower tie plate assembly T along a side wall 120 into aperture 121. As is shown, grid 100 can be mounted between walls 122 and thereafter inserted in the side walls of the lower tie plate assembly T.

Figure 9:
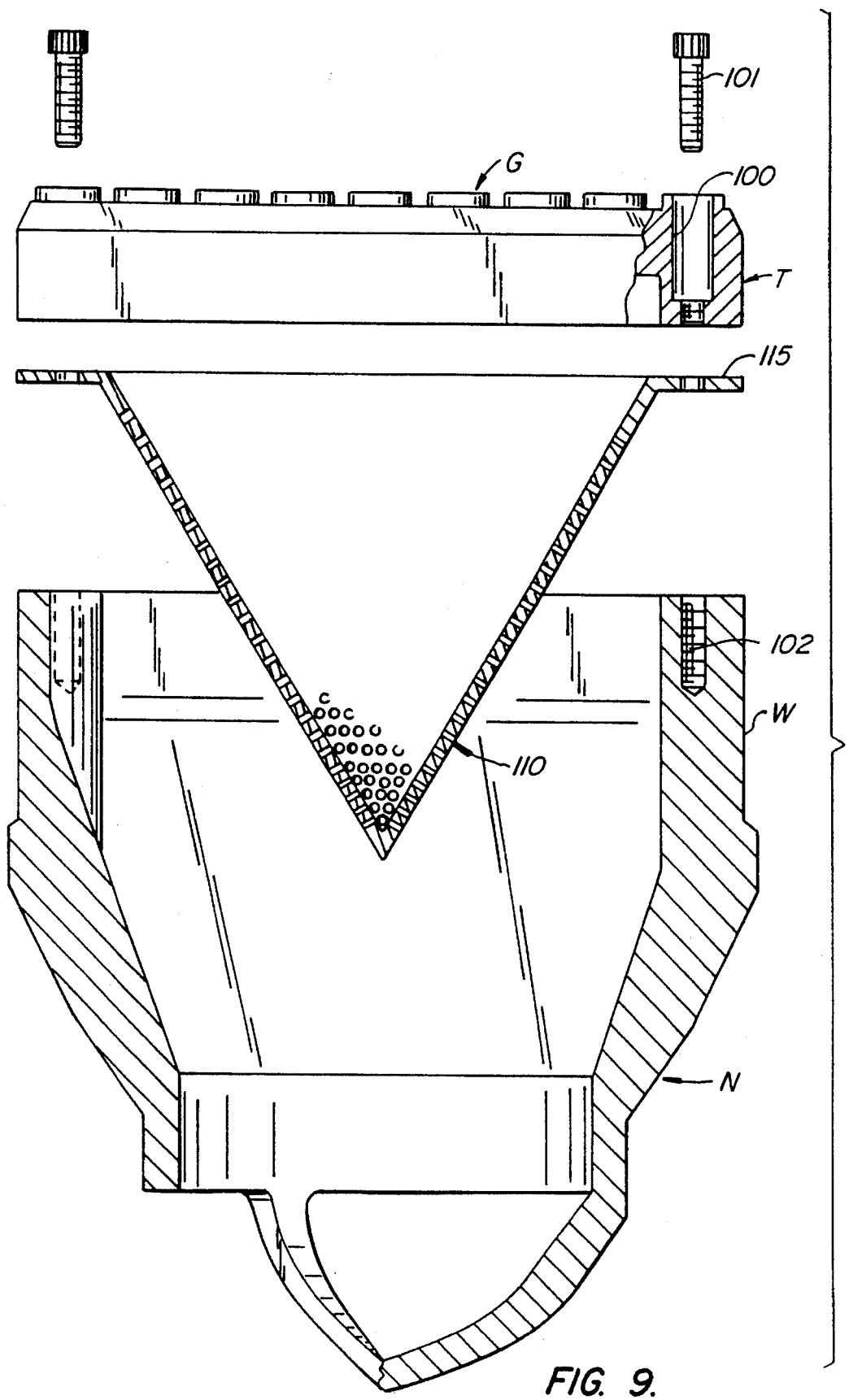
FIG. 9 is a side elevation section utilizing conventional bolts to hold together the lower tie plate, these conventional bolts having overlying threaded apertures to enable conventional tie rods to bolt to the assembled debris catching lower tie plate assembly.

The reader will understand that there is the possibility of constructing this invention with a two part tie plate which is bolted together. Referring to FIG. 9, this can be plainly seen.

Referring to FIG. 9, a lower tie plate T is shown having a nozzle section N and a rod supporting grid section G. Rod supporting grid section G includes a standard threaded bore 100 for receiving tie rods. Nozzle section N has an underlying threaded bore 102 into which cap screw 101 threads fastening rod supporting grid section G. Thereafter, a tie rod (not shown) is conventionally threaded into rod support grid at that portion of threaded aperture 100 not filled by cap screw 101. As disclosed before, a pyramid shaped three dimensional grid construction 110 with a peripheral flange 115 is fastened between the two tie plate sections.

Figure 10:
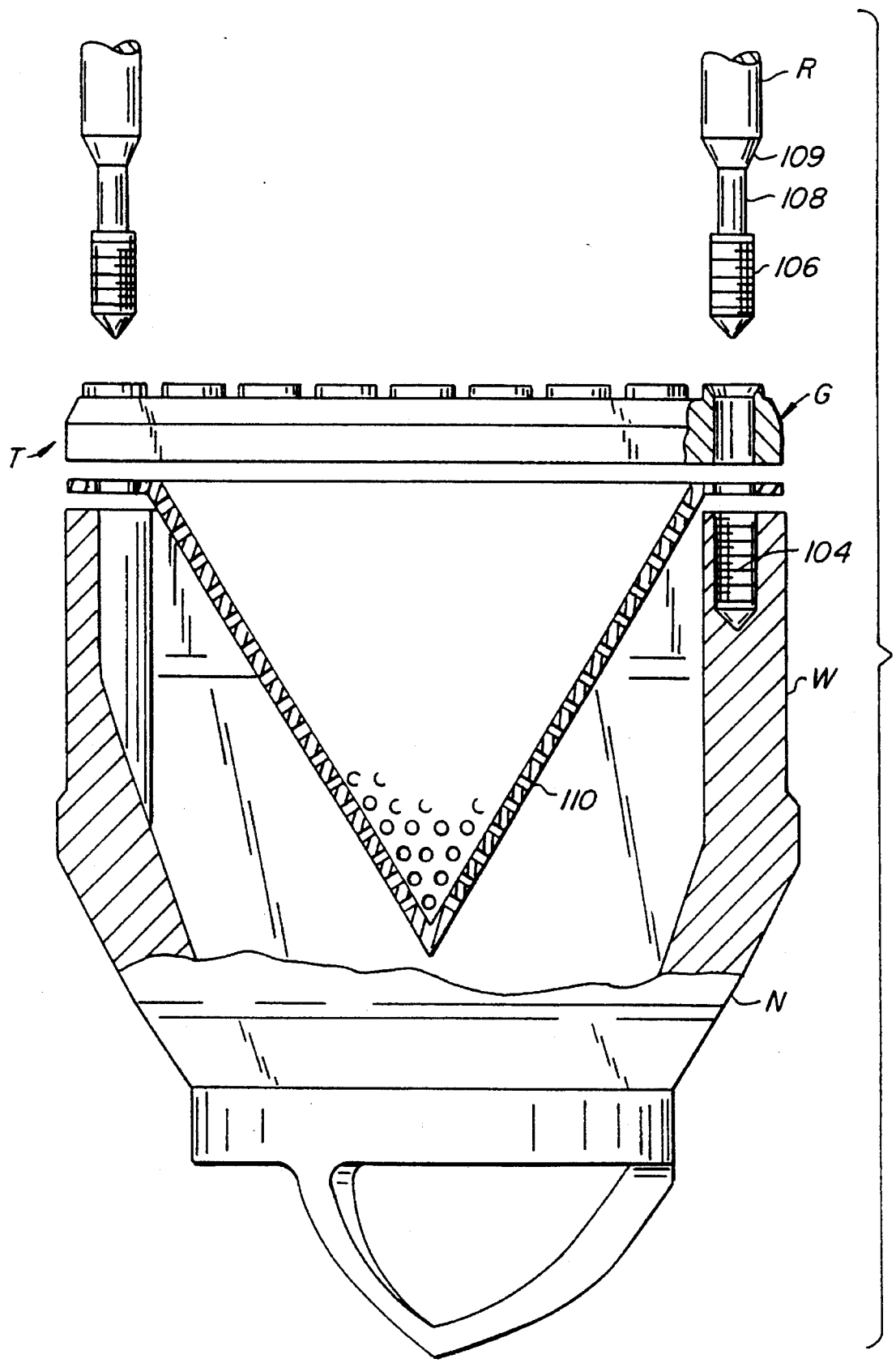
FIG. 10 is a side elevation section similar to FIG. 9 of a lower tie plate having a rod supporting grid assembly section and a separate nozzle section, these assemblies here being shown bolted together by elongate end plugs on the fuel rods for the lower tie plate; and, FIG. 11A, 11B and 11C are respective side elevation sections and two details of a lower tie plate at the plenum having a strainer inserted therein in the form of a double corrugated plate, the lower corrugated plate having large holes and the upper corrugated plate having finer holes for straining and trapping debris.

Referring to FIG. 10, substantially the same construction is shown with the rod supporting grid G and the nozzle section N held together with tie rods having an extended end plug 108. Simply stated tie rods R include a lower plug having an extended neck 108 and a lower threaded portion 106. In operation, tapered portion 109 of the lower end plug bears against rod supporting grid section G. At the same time, threaded section 106 threads into threaded bore 104. As before, three dimensional grid 110 is trapped at flange 115 between the confronting portions of the lower tie plate assembly T.

It will be realized by those having skill in the art that if tie rods R are removed for inspection, the lower tie plate T as shown in FIG. 10 can become disassembled. For this reason, the embodiment of FIG. 9 is preferred.

Figure 11A:
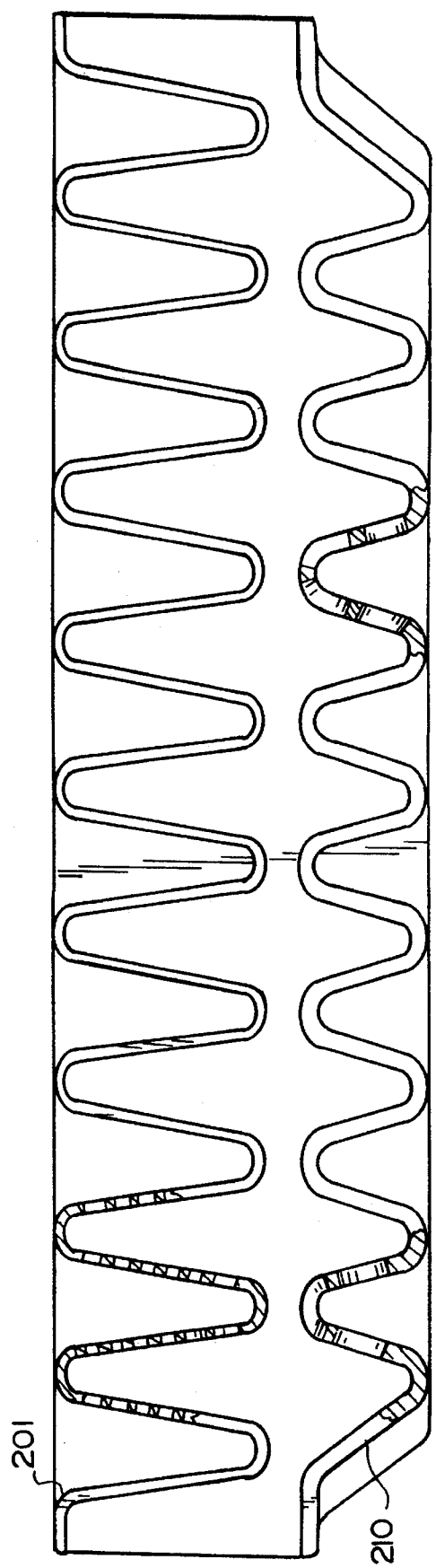
Figure 11B:
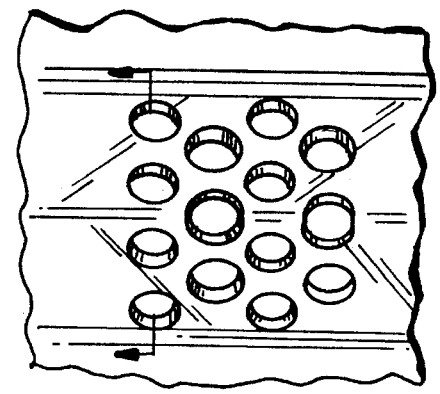
Figure 11C:
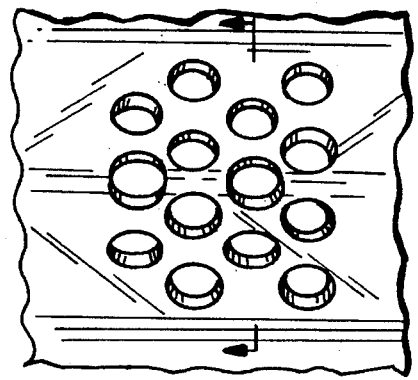

Referring to FIG. 11A, a double corrugated plate configuration for a strainer is shown. This includes an upper corrugated plate 201 and a lower corrugated plate 210. The upper plate can be similar to that described for FIG. 7B. The lower plate is also perforated with equal or larger diameter holes. The lower most ridges of the corrugations (towards the encroaching flow) are solid while the inner ridges (nearest the upper plate) are perforated.

Operation is easy to understand. Debris will grossly be excluded from the lower tie plate supporting grid by lower corrugated plate 210. Due to the larger holes, some debris will pass through the larger holes and into contact with upper corrugated plate 201. There the debris will be halted.

It will be understood that upon the cessation of flow, debris between upper and lower corrugated plates 201, 210 will be trapped. Specifically, for debris making the interstitial penetration between the plates, considerable time under flow conditions is required to pass debris through the larger holes in lower corrugated plate 210. When the flow is stopped, the debris will fall onto the lower plate 210. With no reverse flow, it is highly unlikely that debris will fall through the holes in lower plate 210. Accordingly, the vast majority of such debris will be trapped and consequently be removed with the fuel bundle.

It will understood that the disclosed double plate construction can be utilized with any of the forgoing strainer constructions previously set forth.

The reader will understand that the concepts here disclosed will admit of modification. For example, the interior of the lower tie plate volume V can be cast in anticipation of the receipt of the three dimensional grid construction. For example, a boss running along the interior of flow volume V having the profile of grid 100 can receive and seat the three dimensional grid interior of flow volume V. Likewise, other modifications can be made.

What is claimed is:

1. In a boiling water reactor fuel bundle, a debris catching grid construction for placement within the flow volume defined by the lower tie plate assembly between the inlet nozzle and upper fuel rod supporting grid comprising:

first and second overlying and underlying three dimensional, non-planar perforated plate constructions having side-by-side holes, arranged so that a substantial portion of coolant flowing through said flow volume is caused to change direction between the inlet nozzle and the upper fuel rod supporting grid;

each said perforated plate forming a three dimensional construction having a total cross sectional area exceeding the planar cross sectional area of the flow volume of said lower tie plate between said inlet nozzle and said rod supporting grid;

said underlying plate having larger holes than said overlying plate;

means for mounting each said three dimensional perforated plate construction interiorly of the flow volume of said lower tie plate such that debris passing through the larger holes of the underlying plate will be trapped between the first overlying plate and the second underlying plate.

2. In a boiling water reactor fuel bundle, a debris catching grid construction according to claim 1 and wherein said sidewalls of said overlying and underlying three dimensional grid construction are corrugated.

3. In a boiling water reactor fuel bundle, comprising in combination:

a lower tie plate assembly including a fuel rod supporting grid, an inlet nozzle, and sidewall extending between said nozzle to the edges of said grid to define therebetween a flow volume interior of said tie plate;

a plurality of upstanding fuel rods, said fuel rods supported on said rod supporting grid and extending in upstanding vertical side-by-side relation;

an upper tie plate for supporting at least some of fuel rods and providing connection to said lower tie plate through at least some of said fuel rods;

first and second overlying and underlying three dimensional, non-planar perforated plate constructions having side-by-side holes, arranged so that a substantial portion of coolant flowing through said flow volume is caused to change direction between the inlet nozzle and the upper fuel rod supporting grid;

each said perforated plate forming a three dimensional construction having a total cross sectional area exceeding the planar cross sectional area of the flow volume of said lower tie plate between said inlet nozzle and said rod supporting grid, said underlying plate having larger holes than said overlying plate;

means mounting each said three dimensional perforated plate construction interiorly of the flow volume of said lower tie plate, such that debris passing through the larger holes of the underlying plate will be trapped between the first overlying plate and the second underlying plate.

4. In a boiling water reactor fuel bundle according to claim 3 and wherein:

said sidewalls of said overlying and underlying three dimensional grid construction are corrugated.

* * * * *